June 12, 1962     T. H. HOLMES     3,038,692
HIGH-TEMPERATURE DUAL-SEAT GATE VALVE
Filed April 27, 1960     2 Sheets-Sheet 1
FIG_1
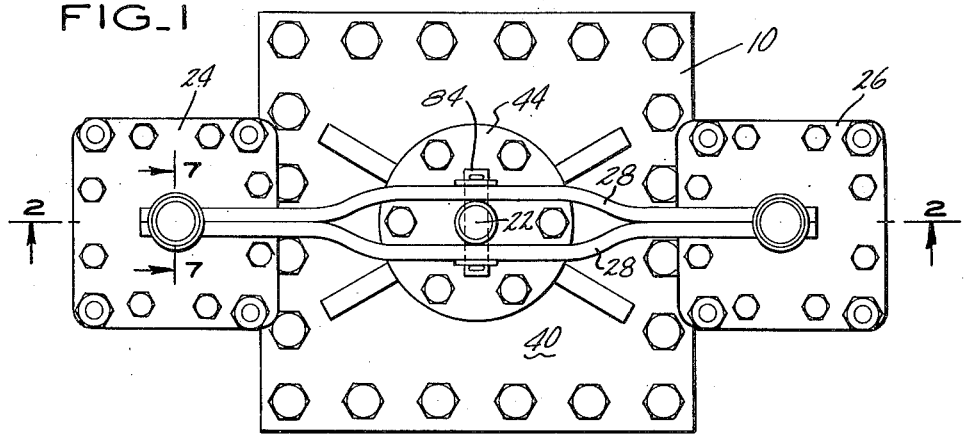
FIG_2
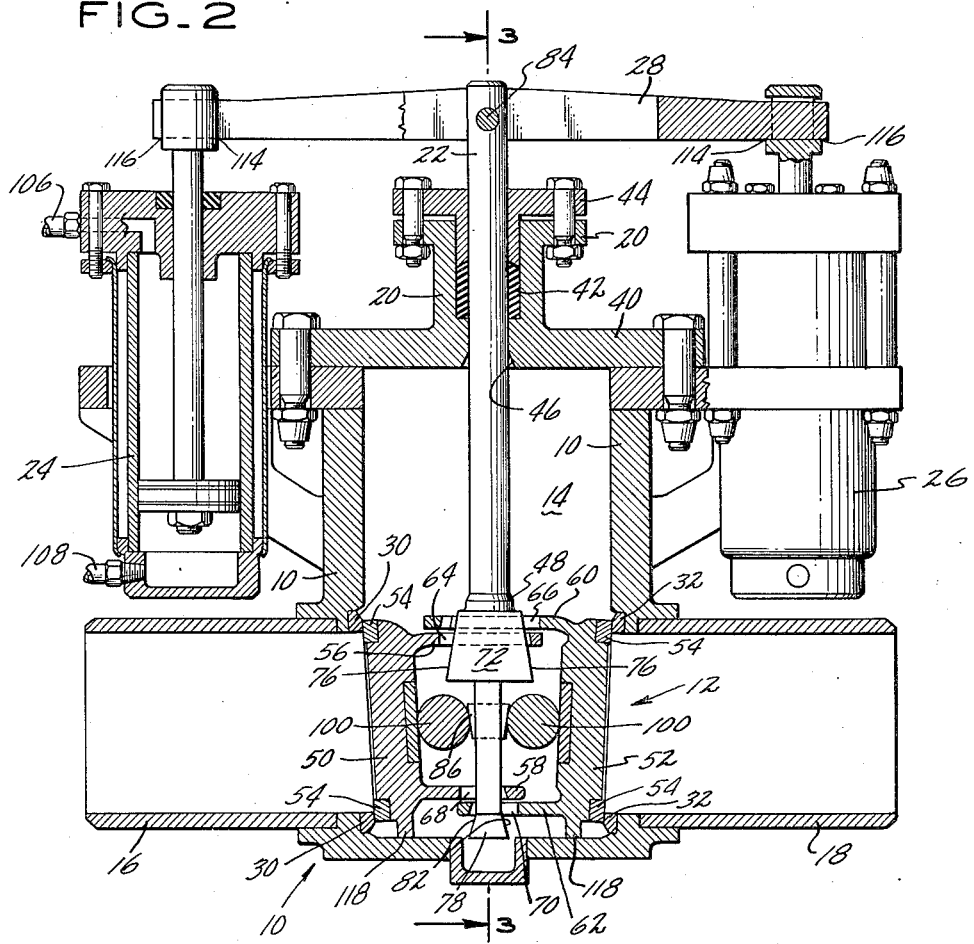
INVENTOR
TRENT H. HOLMES
BY M. B. Tasker
ATTORNEY June 12, 1962 T. H. HOLMES 3,038,692
HIGH-TEMPERATURE DUAL-SEAT GATE VALVE
Filed April 27, 1960 2 Sheets-Sheet 2
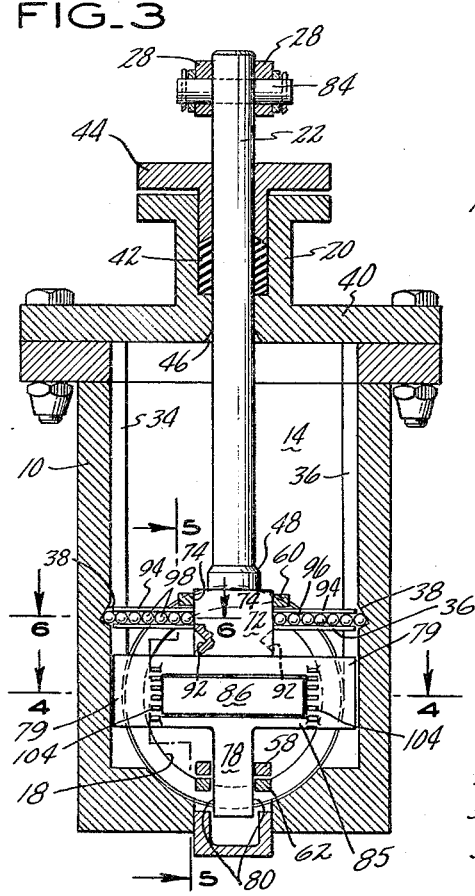
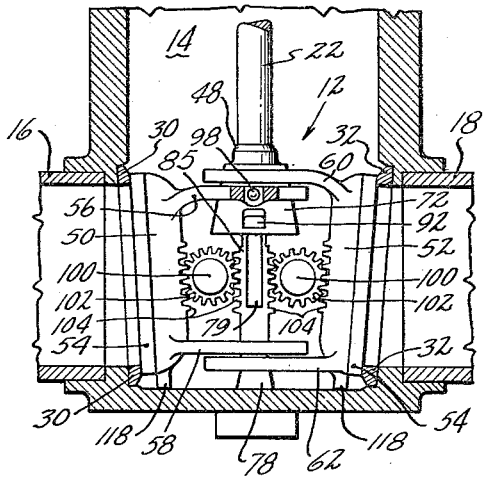
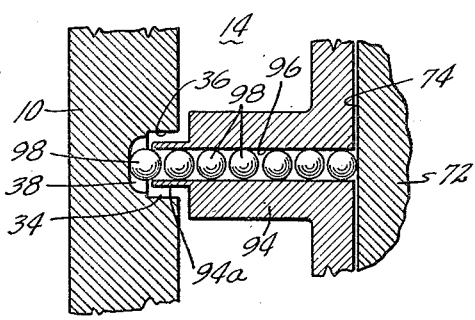
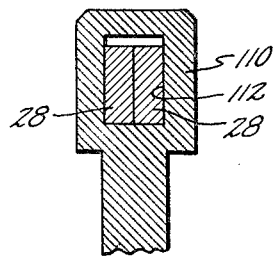
INVENTOR
TRENT H. HOLMES
BY M. B. Tasker
ATTORNEY United States Patent Office 3,038,692
Patented June 12, 1962

3,038,692
HIGH-TEMPERATURE DUAL-SEAT GATE VALVE
Trent H. Holmes, Rocky Hill, Conn., assignor to United Aircraft Corporation, East Hartford, Conn., a corporation of Delaware
Filed Apr. 27, 1960, Ser. No. 24,970
8 Claims. (Cl. 251—167)

This invention relates to gate valves and more particularly to a duoble-disc gate valve for use in a system for controlling extremely hot fluids which may be of a corrosive nature, such as liquid metals. An example of such a metal is liquid sodium.

It is an object of this invention to provide an improved gate valve which reduces the possibility of leakage which is common in conventional-type gate valves under these adverse conditions of service.

Another object of the invention is to provide such a gate valve in which there are no sliding parts under heavy load in the operation of the valve, thus eliminating the possibility of galling or fusion of the relatively moving parts which cooperate at high temperatures and high pressures.

A further object of this invention is to provide an improved self-equalizing actuating mechanism which prevents binding of the reciprocating parts of the valve.

A yet further object of the invention is to provide a gate valve which will operate satisfactorily in any position.

A further object of the invention is generally to improve the construction and operation of liquid metal valves.

These and other objects and advantages of the invention will be apparent or will be pointed out in the following detailed description of a preferred embodiment of the invention. In these drawings:

FIG. 1 is a plan view of the valve and its actuating mechanism;

FIG. 2 is a sectional elevation taken on line 2—2 of FIG. 1;

FIG. 3 is a view taken on line 3—3 of FIG. 2;

FIG. 4 is a sectional view taken on line 4—4 of FIG. 3;

FIG. 5 is a sectional view taken on line 5—5 of FIG. 3;

FIG. 6 is a detailed sectional view on an enlarged scale taken on lines 6—6 of FIG. 3; and FIG. 7 is a view taken on line 7—7 of FIG. 1.

The improved valve of this invention comprises a main body housing 10, a movable valve assembly 12 which operates in a chamber 14 in the main body housing, inlet and outlet ducts 16 and 18 for connecting the valve into the fluid-carrying system, a bonnet 20 through which a valve-actuating stem 22 operates, and two actuating piston and cylinder elements 24 and 26 the movable elements of which are connected to the valve-actuating stem by a rocker arm 28 for operating the movable valve assembly so as to either completely restrict the flow or to allow totally unrestricted flow of the fluid in the fluid-carrying system.

The main body of the valve is generally rectangular, as will be seen from FIGS. 1, 2 and 3, and includes the central rectangular chamber 14 into which the aligned annular ducts 16 and 18 extend. Annular body seat rings 30 and 32 are positively attached to the main body 10 at the points of intersection of the valve assembly chamber 14 and the inlet and outlet ducts, respectively. The planes of said body seat rings are slanted so that their lower sides are closer together than their upper sides, as viewed in FIG. 2. Two keyways 34 and 36, rectangular in section, extend vertically along the inside faces of the valve assembly chamber 14. These are opposite to one another and lie in vertical planes parallel to the line of fluid flow through the valves. These keyways can be seen most clearly in FIG. 3. The longitudinal axes of keyways 34 and 36 are centrally located along their respective chamber faces. A triangular notch 38 is cut out of each keyway intermediate its ends for a purpose which will later appear.

Chamber 14 is closed by a cover 40 which carries the bonnet 20 through which the valve assembly actuating stem 22 reciprocates. A packing 42 is provided in the bonnet which is compressed by a gland nut 44 to provide a fluid seal about the stem 22. The inside entrance to the passage through which the stem reciprocates is provided with a frusto-conical valve seat 46 arranged to cooperate with a frusto-conical valve 48 on stem 22 engageable with seat 46 in the extreme upper position of stem 22 when the main valve is fully opened.

The movable valve assembly 12 includes two discs 50 and 52. Each disc is provided with a positively attached disc seat ring 54 which engages one of the body seat rings 30 and 32 when the gate valve is closed. These disc seat rings 54 may, for example, be secured to the disc by welding or brazing. Disc 50 has an upper ear 56 and a lower ear 58 formed integral therewith. These ears are substantially parallel and extend inwardly toward the valve stem near the periphery of the disc at an angle approximately 90° from the back face of the disc, i.e., from its nonsealing face. Disc 52 has two somewhat similar ears 60 and 62 which are diametrically opposed to ears 56 and 58 and overlap the latter, so that the closer spaced ears of disc 50 fit loosely between the more widely spaced ears of the disc 52, as shown most clearly in FIG. 2. The overlapping ears 56 and 60 have passages 64 and 66 and the ears 58 and 62 have passages 68 and 70 therein through which the stem 22 passes. It will be noted that these pairs of passages 64, 66 and 68, 70 are slightly out of vertical alignment.

Actuating stem 22 is provided with an integrally attached trapezoidal frustum 72 intermediate its ends having two parallel sides 74 (FIG. 3), and two oblique inwardly and upwardly directed sides 76 (FIG. 2). The valve is shown in the closed position in FIG. 2, and in this position of the valve the trapezodial frustum 72 is at the level in which the upper ends of its oblique sides 76 lie in the passages 64 and 66. Due to the slight misalignment of these passages previously mentioned, one inside edge of passage 64 in ear 56 enagages the right-hand oblique wall 76 of member 72, while the inside edge of pasasge 66 of ear 60 engages the diametrically opposite oblique wall 76 of member 72.

A similar trapezoidal frustum 78 is provided at the lower end of stem 22 which has the same parallel sides 80 and oblique sides 82 which occupy the same relationship to the passages 68 and 70 in ears 58 and 62, except that member 78 in the closed position of the valve, shown in FIG. 2, has its upper end slightly below the passages in both ears 58 and 62. The parallel sides of the trapezoidal frustums 72 and 78 are arranged to lie in planes parallel to vertical planes formed by lines of fluid flow through the valve. The valve stem is connected at its upper end to the rocker arm 28 by transverse pin 84.

The stem 22 has a hollow, somewhat rectangular wedge-receiving and guiding portion 85 between the trapezoidal frustums 72 and 78 which has integral outstanding diametrically opposed guiding lugs 79 adapted to slide up and down in keyways 34 and 36 in the casing. The hollow-guiding portion 85 of the stem is open at the sides and carries therein a wedge 86. The wedge is inserted from the side of the stem-guiding portion 85 and fits therein in such a way that, while it is held against movement up or down relative to the stem, it is allowed a limited amount of lateral movement relative to the stem.

Two triangular notches 92, substantially like those cut in keyways 36, are also cut in the faces of the intermediate trapezoidal frustum 72 facing the keyways and having their centers in a vertical plane passing through the centers of the triangular notches 38 cut in these keyways. It will be noted that the notches 92 are positioned near the base of the trapezoidal frustum 72, as shown in FIG. 3.

The top ear 56 of disc 50 has two diametrically opposed projections 94, the reduced ends 94a of which extend into keyways 34 and 36. A passage 96 extends through ear 56 along a diametric line passed centrally through each projection 94. A series of balls 98 is provided in the passage of each projection 94, which in the position of the trapezoidal frustum 72 shown in FIG. 3, just completely fills the passage 96 therein and the aligned notch 38 in the adjacent keyway. Thus, in this, the closed position of the valve, the discs 50, 52 are locked against sliding movement on their seats even under heavy loading. This prevents galling of the cooperating surfaces on rings 30, 32 and disc seat rings 54.

A cylindrical roller 100 is rotatably mounted between the back face (nonsealing face) of each disc and wedge 86, as shown in FIG. 4. Both ends of each roller 100 are provided with gear teeth 102 which engage racks 104 on both the back face of each disc 50, 52 and on stem portion 85. This geared connection allows a small amount of vertical movement of the rollers relative to the actuating stem and discs, as well as rotary motion, and at the same time preventing the rollers from falling. It will also be noted that the contacting surfaces of the rollers and the wedge are slightly curved, the surfaces of the rollers being longitudinally convex and the surfaces of the wedge being correspondingly concave.

Actuating piston and cylinder elements 24, 26 are provided with the usual fluid connections 106 and 108 above and below the pistons for the admission and discharge of the actuating fluid in a usual manner. If the actuating system were ideal, the piston rods of the two actuators would travel at exactly the same speed. Since some variations occur in practice, means are provided for equalizing the linear movement of the piston rods to eliminate binding of the rods or of the actuating stem of the valve. The fluid-operated pistons are conventional in design. Each piston rod is provided at its upper end with an enlargement 110 which is machined to have a horizontal rectangular hole 112. The rocker arm 28 is machined at its opposite ends to a rectangular cross section, so that it can be received freely within the rectangular holes in the piston rod enlargements 110 of the actuating elements and with a vertical dimension which is slightly less than the vertical dimension of the rectangular holes 112 (FIG. 7). The length of each arm of the rocker 28, from the center pin 84 to the inside edge 114 (FIG. 2) of the square shoulders formed by the rectangular holes 112 in the piston rods, is equal. It will be noted that each arm of the rocker 28 extends through, and slightly beyond, the outside edge 116 of the square shoulder formed by rectangular holes 112 in the piston rods.

In the position of the valve parts shown in FIG. 2, fluid has been admitted to passages 106 of actuating elements 24, 26, and the valve stem has been moved to its extreme lower position in which stops 118 on the lower periphery of discs 50, 52 have engaged the bottom wall of chamber 14.

The operation of the valve will be best understood by reference to FIGS. 2 and 6, inclusive, in which the valve is shown in its closed position. It will be noted that when the valve is closed, the balls 98 at one end of the trains of balls (FIGS. 3 and 6) enter into the notches 38 in the back of keyways 34 and 36, and that they are held in these notches by engagement of the balls at the other end of the trains with the straight sides 74 of the trapezoidal frustum 72. Since the two trains of balls are located in passages in extensions 94 of ear 56 of valve disc 50, both discs 50 and 52 are locked against any vertical movement on their seats during the time that lateral pressure is exerted thereagainst by wedge 86 and rollers 100.

As actuating stem 22 is moved upward in a valve-opening direction, notches 92 very shortly come opposite the trains of balls, permitting the latter to move transversely inwardly into the notches 92 and out of the notches 38. Further upward movement of the actuating stem 22 now carries the discs 50 and 52 upward with it.

During the initial upward movement of the actuating stem 22, while the discs 50 and 52 are locked by the balls against upward movement, the wedge 86 carrying the rack 104 causes the rollers 100 to rotate and move linearly upward with respect to the discs and linearly downward with respect to the actuating stem. This action cooperates with the slanted back faces of discs 50 and 52 and the slanted faces of the wedge 86 to release the pressure tending to force the disc seats 54 against the body seats 30 and 32. Simultaneously with this action, the oblique faces of the intermediate and end trapezoidal frustums 72 and 78, respectively, engage the inclined faces of the openings in the ears of discs 50 and 52 so as to pull these discs laterally out of contact with the body seat rings. This process continues until the balls 98 have disengaged the notches 38 of the keyways and have engaged the notches 92 of frustum 72 when the discs will have been completely disengaged from the body seat rings. During the remainder of the upward movement of the stem, the discs 50 and 52 are carried by the stem without any relative movement of the rollers and discs relative to the stem. The advantage of this operation is that no sliding of the discs can take place while they are heavily loaded against the body seat rings, thus preventing galling and possible fusion of the disc seat rings and the body seat rings at high temperatures.

When the stem reaches its extreme upward position, the frusto-conical valve 48 on stem 22 engages with seat 46 on the bonnet to form an effective seal which carries additional protection against leakage past the bonnet while the valve is open.

When the valve is in the fully open position, the balls 98 are in the notches 92 of the intermediate trapezoidal frustum 72. As the actuating stem is lowered by the pistons and rocker arm 28, the movable valve assembly is carried downwardly by the actuating stem without any relative movement between the discs, the rollers and the actuating stem. This continues until the stops 118 of the discs come in contact with the inside face of the bottom of the valve assembly housing 14 (FIG. 2). At this stage of the closing operation, the passages 96 containing the trains of balls 98, are in horizontal alignment with the notches 38 of the keyways 34 and 36, respectively. Since the discs 50 and 52 can no longer move downwardly, the stem 22 which carries the frustum 72 moves downward relative to the discs. The notches 92 in the frustum cam the balls 98 laterally outward into notches 38, allowing the actuating stem 22 to continue its downward movement independent of the discs. The wedge 86 is attached to the operating stem 22 so that it is free to move with respect to the stem over a limited range in the line of fluid flow through the valve. It is self-aligning with respect to rollers 100 throughout the entire operation of the valve. This arrangement also prevents the actuating stem 22 from carrying any sustained load.

The ball-locking mechanism has the additional advantage of allowing the valve to be operated when in any position, since it cooperates with both the stem and the keyway notches to allow the valve assembly to move laterally in the direction of stem movement only when the valve's seating rings are free from heavy loading. It also acts as a positioning device to properly align the disc-seating rings and the body-seating rings when the valve is closed, regardless of the entire valve unit.

The fluid-operated cylinder and piston units 24 and 26 are in themselves of conventional design. Means are provided, however, to equalize the travel of the pistons and piston rods, so that one will not get ahead of the other and cause cramping of the stem 22. It will be noted from FIG. 7 that the enlarged upper end 110 of the piston rods have a rectangular opening 112 therein, which is somewhat larger in its vertical dimension than the dimension of the end of rocker arm 28. The latter can rock in this opening, so that it rests against either the inside edge 114 of the enlargement or the outside edge 116. Thus, if the right-hand piston gets ahead of the left-hand piston, the rocker arm 28 at its right-hand end will engage the inside edge 114 of the aperture and will have a shorter lever arm as measured from pin 84 than the lever arm of the left-hand piston which will be measured from its outside corner 116 to the pin 84. Since the pressure acting on the two pistons is the same, the piston having the longer lever arm, and hence the mechanical advantage, will overtake the piston having the shorter lever arm, thus equalizing their travel.

As a result of this invention, it will be evident that a gate valve has been provided in which the possibility of leakage commonly associated with conventional-type gate valves has been minimized. Further, a gate valve has been provided in which there are no sliding parts under heavy load, thereby eliminating galling or fusion of the moving parts at high temperatures normally resulting from sliding parts operating under heavy loading at these high temperatures.

It will further be evident that by providing two fluid-operating actuating pistons to operate the valve, the complete valve unit is advantageously compact, as compared with a valve unit operating by one actuating cylinder. Also, by providing two actuating pistons, a self-equalizing operation has been provided which prevents binding either of the piston rods or of the actuating stem of the valve.

It will further be evident that a valve has been provided which is capable of being operated in any position of the valve.

While only a single embodiment of the invention has been illustrated and described, it will be understood that various changes may be made in the construction and arrangement of the parts within the scope of the invention.

I claim:

1. In a gate valve, a casing having a passageway therethrough for fluid, a chamber in said casing extending into said passageway, a valve stem extending into said chamber and movable in the direction of its length therein, said casing having oppositely disposed valve seats on opposite sides of the line of movement of said stem across the intersection of said passageway and said chamber, a movable valve assembly carried by said stem, said assembly including a pair of valve members movable laterally against said valve seats, said valve members having pairs of mutually inwardly directed ears at the top and bottom of said valve members with passages through said ears, two vertically spaced enlargements on said stem, one in position to cooperate with each pair of said ears, said enlargements having inwardly and upwardly tapered sides adjacent said valve members which extend into said passages and cooperate with said ears to move said valve members laterally toward each other upon initial longitudinal movement of said stem from its valve-closed position, a wedge supported on said stem between said enlargements for limited lateral movement relative to said stem, said wedge having opposed downwardly and inwardly directed surfaces, and rollers located between each surface and the nonsealing surface of the adjacent valve member.

2. A gate valve including the combination of claim 1 in which the valve stem and the nonsealing faces of the valve members have toothed racks which cooperate with gear teeth on the ends of the rollers during the movement of the valve stem into and out of valve-closed position.

3. A gate valve including the combination of claim 2 in which vertical keyways are formed in opposed surfaces of said chamber and said stem has projections in the vicinity of said wedge formed to slide in said keyways.

4. A gate valve including the combination of claim 3 in which one ear of the upper pair has opposed arms provided with passages therethrough which are filled with balls, and notches are formed in said keyways to receive the adjacent ball in each passage when the valve is in closed position, said upper stem enlargement having vertical sides opposite said keyways engaged by the innermost balls in said passages, said vertical sides of said enlargement each having a ball-receiving notch which is located below said ball-filled passages in the closed position of the valve.

5. In a gate valve, a casing having a vertical rectangular chamber, fluid passages intersecting opposite sides of said chamber near the bottom thereof, valve seats on said casing surrounding said fluid passages, a valve stem extended into said casing from the top and movable vertically therein, a movable valve assembly carried by the lower end of said stem including two disc-like valve members movable laterally against said seats, two vertical keyways formed in opposite side walls of said casing, a hollow wedge-supporting portion adjacent the lower end of said stem, a wedge member carried by said stem in said supporting portion having freedom for limited lateral movement relative to said stem, said wedge member having inwardly and downwardly inclined faces confronting the nonsealing faces of said valve members, and a roller between each inclined face of said wedge member and the confronting nonsealing face of a valve member, and means for holding said rollers in the aforesaid position including racks on said valve members and on said stem and cooperating gear teeth on said rollers.

6. A gate valve for high-temperature corrosive fluids comprising a valve body having a valve chamber generally rectangular in cross section, aligned horizontal inlet and outlet ducts intersecting said chamber, two valve discs in said chamber each forming a closure for one of said ducts, a vertically reciprocable valve stem for moving said discs vertically in said chamber into and out of alignment with the ends of said ducts, keyways running vertically along opposite side walls of said chamber, each having a notch in its back wall, a trapezoidal frustum on said stem intermediate its ends having parallel walls confronting said keyways, each of said parallel walls having a notch therein which is opposite the confronting keyway in said chamber side wall, the other opposed walls of said frustum being upwardly and inwardly inclined, said discs having upper peripheral inwardly extended ears provided with passages through which said frustum passes, one of said ears having diametrical projections the ends of which enter said keyways, each projection having a passage therein containing a plurality of balls sufficient to fill said passageway from the flat face of said frustum to the back of the notch in said keyways, said balls when in the notches in said keyways locking said discs against up and down movement on their seats, rollers mounted on the back faces of said discs, and wedge means carried by said stem having its ends slidable in said keyways, said rollers having gear teeth at their ends, and racks carried by said wedge means and by said discs intermeshing with the gear teeth on said rollers.

7. A gate valve including the combination of claim 6 in which the wedge means is mounted on the valve stem so that it is free for limited floating movement in the line of fluid flow through said inlet and outlet ducts.

8. A gate valve including the combination of claim 7 in which the surfaces of the wedge means and the nonseating faces of the valve discs which contact the rollers are concave and the rollers are correspondingly convex.

(References on following page)

References Cited in the file of this patent

UNITED STATES PATENTS

| | | |
|---|---|---|
| 476,668 | Miller | June 7, 1892 |
| 600,181 | Smith | Mar. 8, 1898 |
| 616,886 | Brinkmann | Jan. 3, 1899 |
| 1,023,955 | North | Apr. 23, 1912 |
| 1,705,481 | Karnath | Mar. 19, 1929 |
| 1,999,155 | Karnath | Apr. 23, 1935 |
| 2,602,298 | Ashton et al. | July 8, 1952 |

FOREIGN PATENTS

| | | |
|---|---|---|
| 2,451 | Great Britain | Feb. 3, 1893 |
| 735,816 | France | Sept. 6, 1932 |